(12) United States Patent
Miller (10) Patent No.: US 11,843,792 B2
(45) Date of Patent: Dec. 12, 2023

(54) DYNAMIC DECODER CONFIGURATION FOR LIVE TRANSCODING

(71) Applicant: iStreamPlanet Co., LLC, Las Vegas, NV (US)

(72) Inventor: Adrian Miller, Redmond, WA (US)

(73) Assignee: ISTREAMPLANET CO., LLC, Las Vegas, NV (US)

( * ) Notice: Subject to any disclaimer, the term of this patent is extended or adjusted under 35 U.S.C. 154(b) by 0 days.

(21) Appl. No.: 17/096,876

(22) Filed: Nov. 12, 2020

(65) Prior Publication Data

US 2022/0150514 A1    May 12, 2022

(51) Int. Cl.
*H04N 19/40*    (2014.01)
*G10L 19/16*    (2013.01)

(52) U.S. Cl.
CPC ........... *H04N 19/40* (2014.11); *G10L 19/167* (2013.01)

(58) Field of Classification Search
CPC ........ H04N 19/40; G10L 19/67; G10L 19/167

USPC ..................................................... 375/240.01
See application file for complete search history.

(56) References Cited

U.S. PATENT DOCUMENTS

| 2010/0208856 | A1* | 8/2010 | Fuchikami | ........... | H04N 9/8205 |
| | | | | | 375/371 |
| 2014/0153909 | A1* | 6/2014 | MacInnis | ................. | H04N 9/80 |
| | | | | | 386/353 |
| 2015/0062353 | A1* | 3/2015 | Dalal | ................. | H04N 21/4394 |
| | | | | | 348/515 |
| 2017/0358308 | A1* | 12/2017 | Furse | ........................ | H04S 7/30 |
| 2018/0192064 | A1* | 7/2018 | Kim | ...................... | H04N 19/172 |
| 2018/0241787 | A1* | 8/2018 | Jeong | ...................... | G10L 19/22 |

* cited by examiner

*Primary Examiner* — Joseph G Ustaris
*Assistant Examiner* — Jimmy S Lee
(74) *Attorney, Agent, or Firm* — Bookoff McAndrews, PLLC (57) ABSTRACT

A method and system for managing transcoding of data in a stream that includes identifying an input source change for the stream with a new input source type, and adding a decoder for the new input source type, the decoder configured to output for a respective encoder in a transcoder pipeline.

21 Claims, 9 Drawing Sheets

DYNAMIC DECODER CONFIGURATION FOR LIVE TRANSCODING

TECHNICAL FIELD

The embodiments of the invention are related to the field of managing streaming audio and video content. More specifically, the embodiments of the invention relate to methods and systems for dynamic transcoding of audio and video content responsive to changes in input sources for a stream.

BACKGROUND ART

Streaming media can originate at a source and be available in an initial media format. An application seeking to playback the streaming media may operate on another media format. To accommodate the playback application or any downstream function, transcoding of the streaming media can be employed to convert the streaming from one format to another. Similarly, streaming media can sometimes encompass multiple input sources that may utilize different media formats. Transcoding can then be utilized to unify the input sources to a target media format.

Transcoding can be used to refer to a number of different techniques that transform an input media source. In some cases, transcoding is used to refer to processing an input media source that is already encoded. Transcoding decodes the input media source, in some cases, modifies the decoded media source, then encodes the input media source into another format. The audio and/or video format (codec) of one input media source can be changed from one the source format to a target format. For example, the input format can be an motion pictures expert group (MPEG)2 source, which is often used for broadcast television, that is decoded and re-encoded into an online streaming format such as H.264 video and advanced audio coding (AAC) audio.

Transcoding can also encompass the processes of transrating and transsizing. Transrating involves changing the bitrate of an input media source from an input bitrate to a target bitrate. For example, an input media source such as a 4K video input stream with a bitrate of 13 Mbps can be converted it into one or more lower-bitrate streams such as high definition (HD) with a bitrate of 6 Mbps, standard definition (SD) with a bitrate of 2.5 Mbps, or similar bitrate changes. Similarly, transcoding can encompass the process of transsizing where there is a resizing of the video frame from an input resolution to a target resolution. For example, an input of 4 k URD resolution of 3840×2160 may be down sized to 1920×1080 (1080p) or 1280×720 (720p). Where transcoding is applied to audio, transcoding can also encompass changing the sample rate and number of channels in the received audio.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

Figure 1A:
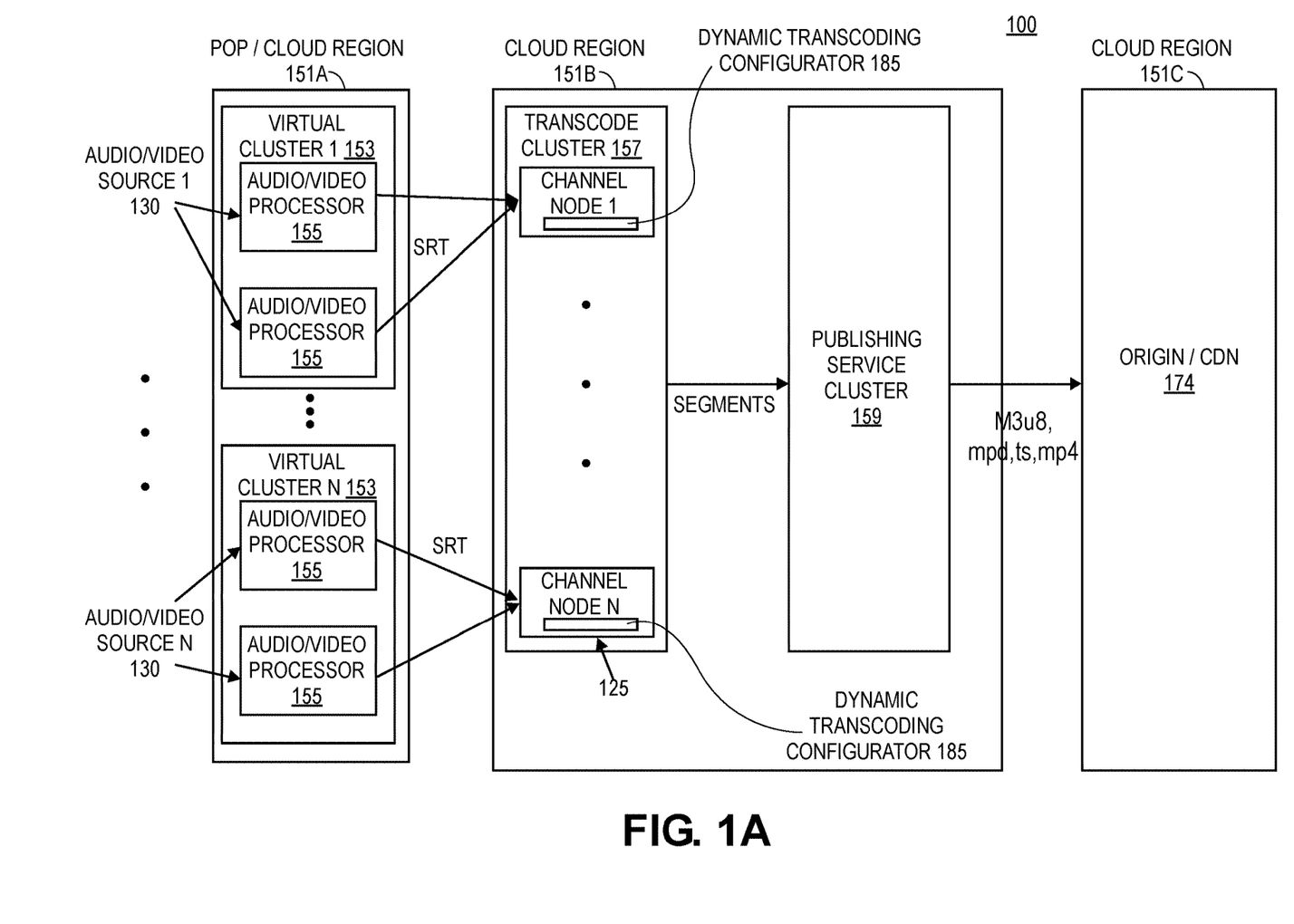
FIG. 1A is a first embodiment of an audio/video streaming system to support dynamic transcoding in a cloud computing environment.

FIG. 1A is a first embodiment of an audio/video streaming system to support dynamic transcoding in a cloud computing environment. The cloud computing environment can include a set of cloud regions 151A-C. A 'set,' as used herein can refer to any whole number of items including one item. These cloud regions can be different cloud computing environments provided by a same or different cloud computing provider. The cloud regions 151A-C can have different geographic locations and electronic device components and resources that are interconnected via communication networks with the other cloud regions 151A-C. Any number, configuration, and variety of cloud computing environments and regions 151A-C can be utilized to provide the audio/video streaming system 100. In some embodiments, some of the components of the audio/video streaming system 100 are located in a set of electronic devices referred to as a point of presence (POP). The POP can be provided by an internet service provider or similar interface through which external resources and electronic devices can interact with the cloud computing environment.

In an example embodiment, the audio/video streaming system 100 includes a set of virtual clusters 153, a transcode cluster 157, and a publishing service cluster 159. Each cluster can be composed of any number and combination of electronic devices including servers, storage devices, networking devices and related devices that make up a cloud computing environment. The virtual clusters 153 can support a set of audio/video processors 155. These audio/video processors 155 can be software components that process the incoming audio/video sources 130 and are hosted by the virtual clusters 153. The audio/video processors 155 can perform tasks associated with each audio/video source 130 to process that audio/video source and can be considered a unit of work or a worker in the audio/video streaming system 100. Each audio/video processor 155 can perform a single task or multiple tasks and can operate in conjunction with other audio/video processors 155 to process the audio/video sources 130. Any number of virtual clusters 153 can manage any number of audio/video processors 155, which together can process any number of audio/video sources 130. Audio/video processors 155 can perform any number of audio/video processing tasks.

The output of the audio/video processors 155 can be provided to a transcode cluster 157. The transcode cluster 157 can further process the audio/video sources to organize the audio/video sources into a set of channels handled by associated channel nodes 125. The transcode cluster 157 and channel nodes 125 can combine audio/video sources from the audio/video processors 155 and encode the resulting audio/video streams according to the configuration of the respective channels to be distributed to the publishing service cluster 159. A transcode cluster 157 is a set of electronic device resources including servers, storage devices, and networking devices that support any number of channel nodes 125. Similarly, the publishing service cluster is a set of electronic device resources including servers, storage devices, and networking devices that support any number of audio/video streams that are to be published to a content distribution network 174 or in some cases returned to an origin server (e.g., an audio/video source provider or other entity that may publish the audio/video stream).

The transcode cluster 157 can receive audio/video input from the audio/video processors in any format or encoding. The audio/video input can be decoded from the input format and re-encoded for a target format. The output of the audio/video streams can include audio/video segments and associated metadata for a target format or encoding. In some embodiments, the publishing service can offer various formats of the input audio/video streams using video encoding formats M3u8, MPD, TS, MP4 and similar audio/video encoding formats to the content delivery network 174.

In the embodiments, the transcoding for each channel node is managed by a dynamic transcoding configurator 185. The dynamic transcoding configurator, as described further herein, enables the update of transcoding pipelines to accommodate changes in the formats and encoding of the input sources, in particular to support the updating of existing transcoding pipelines with decoders for new input source formats. In some embodiments, the dynamic transcoder configurator can also enable the generation of missing metadata for an audio/video source by caching or synthesizing the metadata.

Figure 1B:
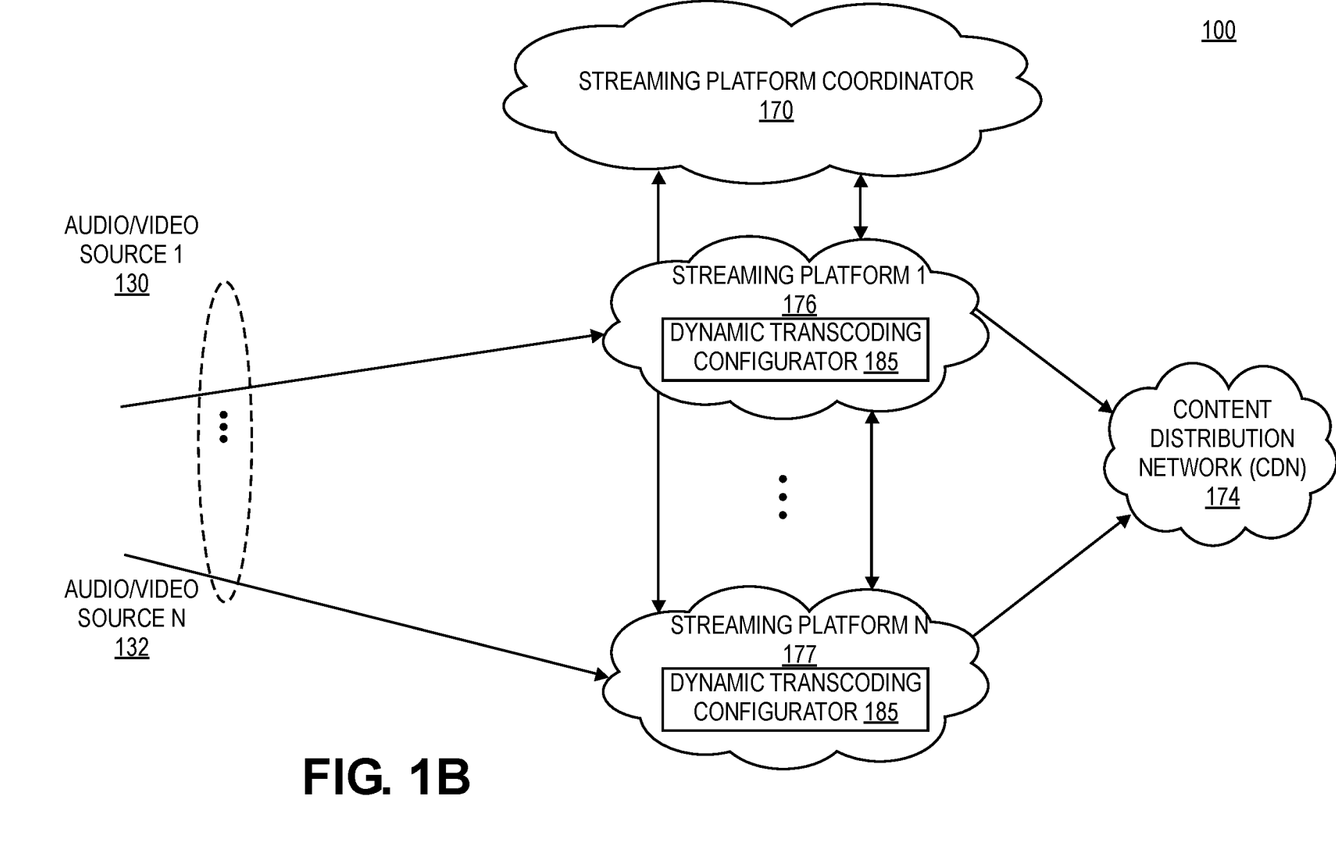
FIG. 1B illustrates another embodiment of an audio/video streaming system containing multiple audio/video streaming platforms.

FIG. 1B illustrates another embodiment of an audio/video streaming system containing multiple audio/video streaming platforms. An audio/video streaming system 100 includes multiple audio/video streaming platforms represented by a streaming platform 1 through a streaming platform N at references 176 and 177, a content distribution network 174, and a streaming platform coordinator 170.

The streaming platform coordinator 170 communicates with all the audio/video streaming platforms including the streaming platforms 1 through N. The streaming platform coordinator 170 coordinates processing of the media contents routed to the various audio/video streaming platforms. The processed media contents from the audio/video sources are then published to the content distribution network 174.

It is to be noted that the various audio/video streaming platforms and/or the streaming platform coordinator may be hosted by any one or more of various cloud computing providers. When two audio/video streaming platforms are hosted by two different cloud computing providers, which generally offer computing resources with different characteristics, the two audio/video streaming platforms are often referred to as heterogeneous audio/video streaming platforms (versus homogenous audio/video streaming platforms hosted by the same cloud computing providers). Cloud computing providers are building up their infrastructures at various geographic locations, and it is now practical for the audio/video streaming system to utilize the cloud infrastructures concurrently at the various geographic locations and/or by different cloud computing providers.

Each audio/video streaming platform 100 may perform various audio/video processing functions including transcoding that can be managed by the dynamic transcoding configurator 185, which is illustrated as a component in streaming platforms 1-N respectively. Any number of instances of the dynamic transcoding configurator 185 can be utilized by a streaming platform to manage transcoding for any number of channels.

Video Streaming Platform in a Cloud Computing Environment

A set of audio/video streaming platforms is a main component of an audio/video streaming system 100 as illustrated in FIG. 1B. The audio/video streaming platforms 176 and the audio/video streaming system 100 can perform any number of operations to process any number of input audio/video sources 130-132 and output via a content distribution network 174 to reach any number of consuming devices and software applications. The operations performed on the audio/video sources 130-132 can include transcoding that is managed by the dynamic transcoding configurator 185. Each streaming platform 176 can execute any number of dynamic transcoding configurators 185 using workers or similar mechanism as described further herein. The dynamic transcoding configurator can operate on a per streaming platform 176, per audio/video source 130-132, per channel, per transcoding pipeline, or similar basis.

Figure 2:
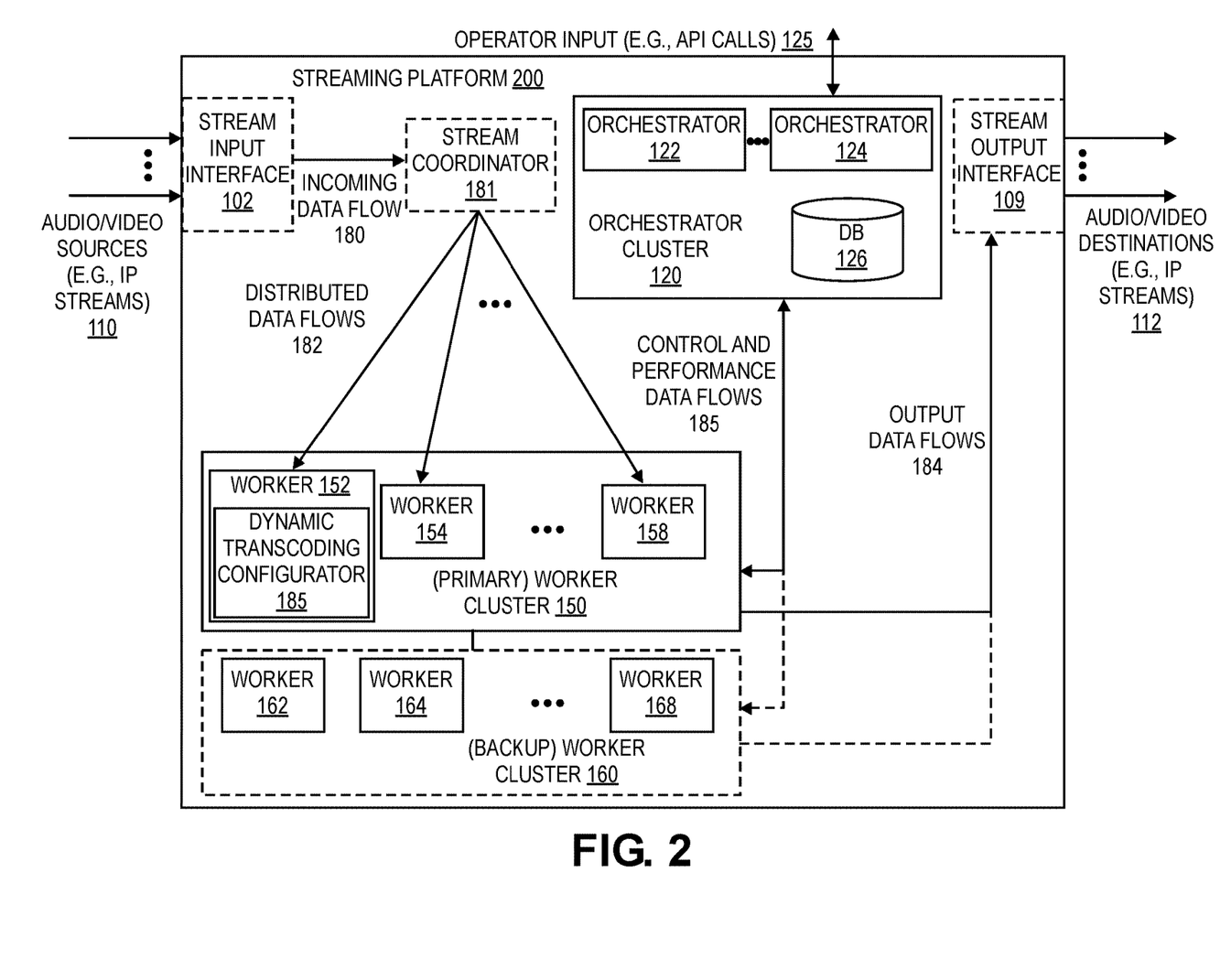
FIG. 2 is a diagram of one embodiment of one of the video streaming platforms in the video streaming system.

The architecture of the audio/video streaming platform and its operations are discussed in more detailed discussion with relation to the additional figures. FIG. 2 illustrates an audio/video streaming platform in a cloud computing environment according to one embodiment of the invention. A streaming platform 200 (also referred to as an audio/video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, audio/video sources to be processed by the streaming platform 200 enters through the stream input interface 102. An audio/video source contains one or more Internet Packet (IP) packet streams in one embodiment. The IP packet streams may contain one or more live audio/video feeds. A live audio/video feed may be audio/video of a live event or live performance, or may be audio/video of a prerecorded event being played back according to a schedule. The live audio/video feed may be an audio/video broadcasted over cable, satellite, or over-the-air. It is to be noted that any use of the terms "video source," "video stream," and "video feed," as used interchangeably herein, refer to the video and corresponding audio of the particular recorded event (e.g., TV show, live performance, sporting event, etc.), but also may include audio or video only. Additionally, the audio/video source (sometimes referred to as the video and audio streams) of the streaming platform 200 may contain only audio (e.g., an Internet radio stream). The audio/video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD) or similar services.

An audio/video source may be "pushed" to the streaming platform 200 where the audio/video source is in the form of Internet Protocol (IP) packet streams such as the Moving Picture Experts Group (MPEG)-transport streams (MPEG-TS). The IP packet streams logically flow to streaming platform 200 from an external source thus the audio/video source is referred to as being pushed to the streaming platform 200.

An audio/video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 181. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicast data flows into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers that remain on standby and thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through one or more control flows, included in control and performance data flows185.

The orchestrator cluster 120 contains orchestrators 122-124 and an orchestrator database 126 that stores data for operations of the orchestrators. The orchestrators can form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it can also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 170 in FIG. 1).

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 200. It is to be noted that both the stream input interface 102 and the stream output interface 109 may be integrated into parts of worker functions and they may not be individual physical units of the streaming platform 200.

Output data flows goes to audio/video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to an audio/video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider and they may concurrently host applications other than the video streaming platform. Thus, the worker hosts are not dedicated to the streaming platform and they are allocated to the streaming platform as needed and according to coordination of the orchestrators.

It is to be noted that in some embodiments orchestrator cluster 120 also contains a dynamic transcoding configurator 185. The dynamic transcoding configurator185 manages transcoding pipelines (not shown) that can also be executed by workers of the streaming platform 200. As described further herein, the dynamic transcoding configurator 185 manages the transcoding pipelines to add decoders to the respective transcoding pipelines when new formats of input sources are received. In addition, the dynamic transcoding configurator 185 can either cache or synthesize metadata for the use of encoders in the transcoding pipelines when the meta data is not provided by an input source. While the dynamic transcoding configurator 185 is illustrated a stand-alone entity of the orchestrator cluster 120, the dynamic transcoding configurator can be integrated with respective transcoding pipelines, or other entities such as orchestrators 122-124. Additionally, different functions or aspects of the dynamic transcoding configurator 185 can be may be within the orchestrator database 126 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Overall, the streaming platform 200 ingests audio/video sources, transcodes, and transforms the video sources into desired one or more formats for publication and then outputs the resulting audio/video data. The audio/video streaming platform is a distributed architecture using cloud resources, and it is a flexible, scalable, and efficient platform for audio/video processing. The streaming platform 200 receives operator input 125 to the orchestrator cluster 120. The operational input may be from the streaming platform coordinator 170. The communication between the streaming platform coordinator 170 and the streaming platform 200 can include sending requests/confirmations from the streaming platform coordinator and updates/responds from the streaming platform 200. The operator input 125 may also from an operator separately from the streaming platform coordinator 170. The operator input may be in the form of API calls. One of the requests from the streaming platform coordinator is a request to create a workflow for an audio/video source in the streaming platform 200. The request (may be referred to as a channel creation request) may contain a variety of parameters describing the audio/video source and the expected operations. For example, the request may contain at least one of the following:

Mandatory parameters describing the type of the audio/video source (e.g., MPEG-2, MPEG-4, H.265, or similar format), and location of the audio/video source (e.g., ingest protocol, IP address, URI, or similar protocol).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the audio/video source.

The desired contention protection operations for the published output (e.g., Microsoft© PlayReady, Adobe© Access DRM, AES-128 Encryption for HTTP live streaming, or similar operations).

The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 120 creates media workflows for audio/video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

A media workflow contains a large number of tasks to be performed by an audio/video streaming platform. An outside-in network management approach (e.g., SNMP), where the network management system can only collect performance data at a worker level, cannot provide efficient performance monitoring of the processing of the media workflow within the audio/video streaming platform, let alone mitigate any macroblock detected with regard to the processing blocks in a timely fashion. For example, the worker is often implemented as a virtual machine in the audio/video streaming platform, and using SNMP, an operator of the audio/video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder, frame rate conversion, scaling, and/or audio/video encoders), thus cannot provide effective mitigation.

Figure 3:
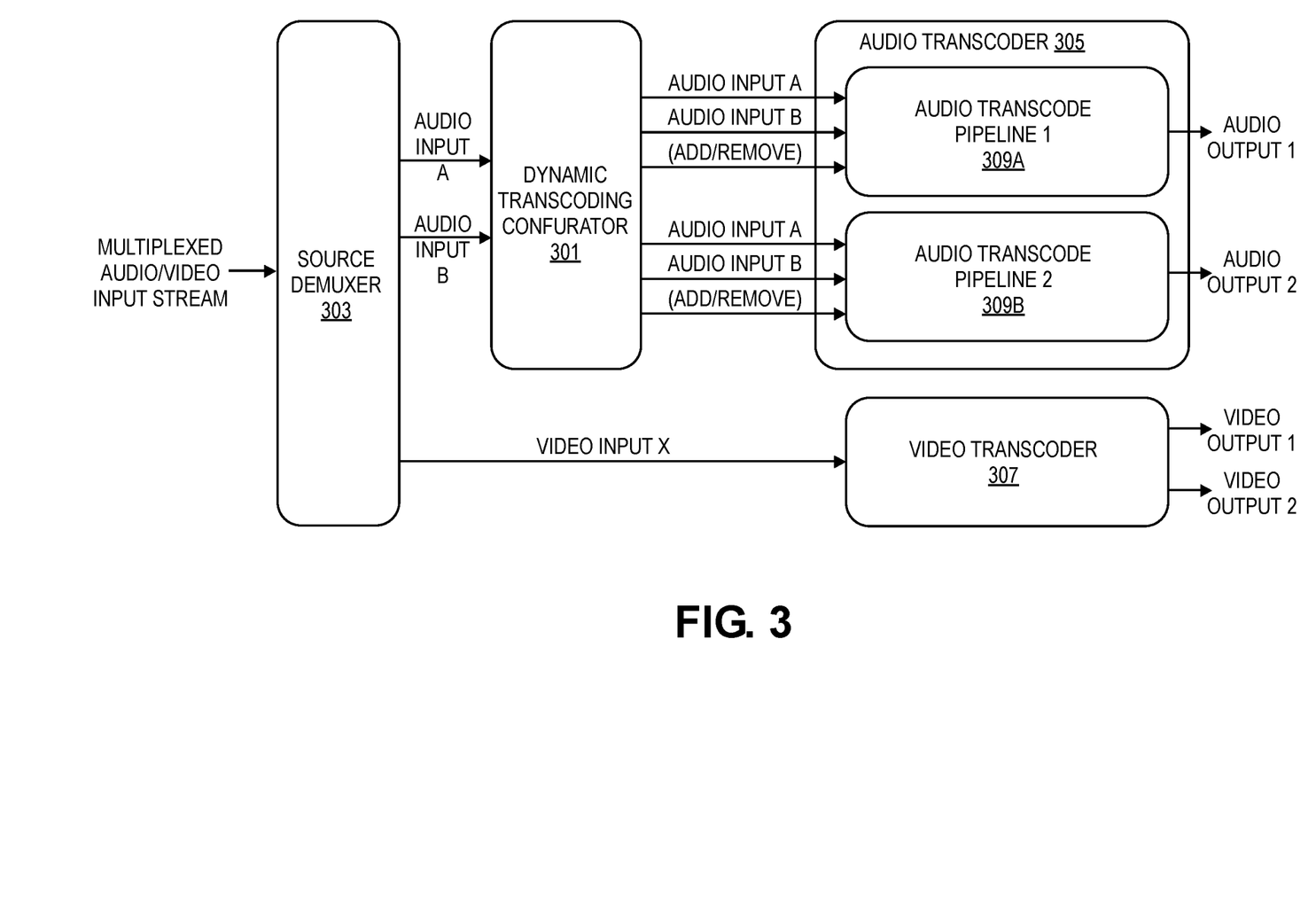
FIG. 3 is a diagram of one embodiment of the components involved in transcoding an audio/video stream.

Operations of Dynamic Transcoding Configurations in an Audio/Video Streaming Platform FIG. 3 is a diagram of one embodiment of the components involved in transcoding an audio/video stream. These components can be implemented by a worker or set of workers of the streaming platform that are operating on an input audio/video source as described above in regard to FIG. 2. The diagram and associated processes are illustrated at a high level to represent the overall function of the video streaming system 100. The audio/video streaming system receives media (e.g., an audio/video source or stream) from a content producer or similar audio/video source.

The media received from content producers can be encoded in any format and can have any size or organization. In some cases, the media can be formatted to satisfy legal agreements between content producers and content distributors who stream the media on their platform (e.g., via a content delivery network (CDN)) and/or to meet the technical requirements of the distributors who stream the media on their platform.

The audio/video streaming system can transcode the received media. The transcoding of the media can be done to format the media to meet the legal and/or technical requirements of the distributor and the platform of the distributor (e.g., the CDN of the distributor). In addition to reformatting the media, the audio/video streaming system can also process the received media to improve the transmission, quality, or other characteristics of the received media. In some embodiments, the audio/video streaming system can compress the received content to reduce the size and bandwidth requirements of the received media. The compression can be done to improve the resource utilization of the audio/video streaming system or the CDN. The CDN can in some cases specify the format and characteristics (e.g., the type of encoding) of the media to be handled by the CDN.

The dynamic transcoding configurator 301 supports dynamic addition and removal of decoders during transcoding as new input codecs and/or configurations are added. Each decoder configuration may be tightly coupled to the encoder it is providing input to, even though all encoders are initialized at startup, prior to any information about the input codecs being available. An encoder encodes the input from one decoder at a time, even if the encoder has more than one decoder available to it.

Transcoding live audio/video streams presents some unique constraints which are not typically encountered in offline or file based transcoding application. The transcoding process must handle the dynamic addition of new input sources that have new media formats. This involves adding decoder for each new format as the input source switches formats/codecs during the live stream in the transcoding pipeline. The number and type of input codecs which will need to be decoded are not know prior to the start of the transcoding process. While decoders can be added during transcoding, the encoders are initialized at startup according to the output configuration of the transcoding pipeline (i.e., the requirements of the target or destination for the media stream).

Encoders are initialized once at startup and run for the entire lifetime of the transcoder pipeline to ensure output by the audio/video platform with no discontinuities and consistent timestamps. For some codecs (e.g., Dolby (E)AC-3 by Dolby Laboratories) the decoder is configured to match the encoder's output configuration. This precludes sharing a decoder output between multiple encoders. The licensing around use of codecs and library implementation constraints can also require that the decoder and encoder form a tightly coupled transcoder pair. In this case the decoder generates audio output and metadata specific to the encoder configuration. The encoder requires both audio and metadata. These constraints prevent implementing a transcoder that creates a single decoder for each input codec and then converts and encodes output from the decoder to each of the required output codecs/configurations. Audio frames can be marked as active or inactive. Active frames output by a decoder are passed to the encoder, while inactive frames are discarded. Even though there may be one or more decoders present in a transcoding pipeline, only one of the decoders will be processing the audio frames marked as active.

When transcoding for a media stream is established, an audio transcoder 305 and video transcoder 207 are established for the audio/video stream. The input audio/video stream is separated by a source demuxer 303 into a video input and a set of audio inputs). The video input is provided to the video transcoder 307. The audio inputs are provided by the source demuxer 303 to the dynamic transcoding configurator 301. The dynamic transcoding configurator 301 provides the audio inputs to a set of audio transcode pipelines 309A, B. A separate audio transcode pipeline is established for each audio output to be generated. The audio outputs each have a separate audio format or configuration. As changes in input audio formats (e.g., changes from AAC stereo to mono) are detected in the input audio/video stream during demuxing by the source demuxer 303 of the input audio/video stream, the dynamic transcoding configurator 301 configures each audio transcode pipeline 309A, B with additional decoders. Decoders are added and removed according to changes to the input audio/video streams detected by the source demuxer 303. Each transcoder pipeline 309A,B can have a different output configuration, this may be a completely different codec/encoder or a different configuration for the same codec/encoder. So transcoding pipelines can have the same encoder type but with different configurations. e.g. Pipeline 1: AAC Stereo, Pipeline 2: AAC Mono, Pipeline 3: AC3 Stereo, Pipeline 4: AC3 5.1, Pipeline 5: EAC3 5.1, or similar configuration. Thus, the encoder instances are always different but the encoder type may be the same.

In some embodiments, there can be multiple cases that may result in new input configurations/codecs that require new decoders. In one case, an input source (e.g., a live input source) changes, for example the input source switches from a movie to an ad with an associated change in streamed audio. In another case, the input source is switched to a new stored source (e.g., video on demand usage) referred to as a 'slate' source. For example, when a live source is lost a loss slate can be played until the live source is available again. However, there are other slates which can be dynamically configured according to customer preference. It is possible that each of these additional slates could have different audio formats.

While the example embodiments are described with relation to changes in input audio/video stream formats that affect the types of input audio and the correlated configuration to update the decoders in the audio transcoder, one skilled in the art would appreciate that a similar processes for dynamic transcoding can be applied to video transcoding.

Figure 4:
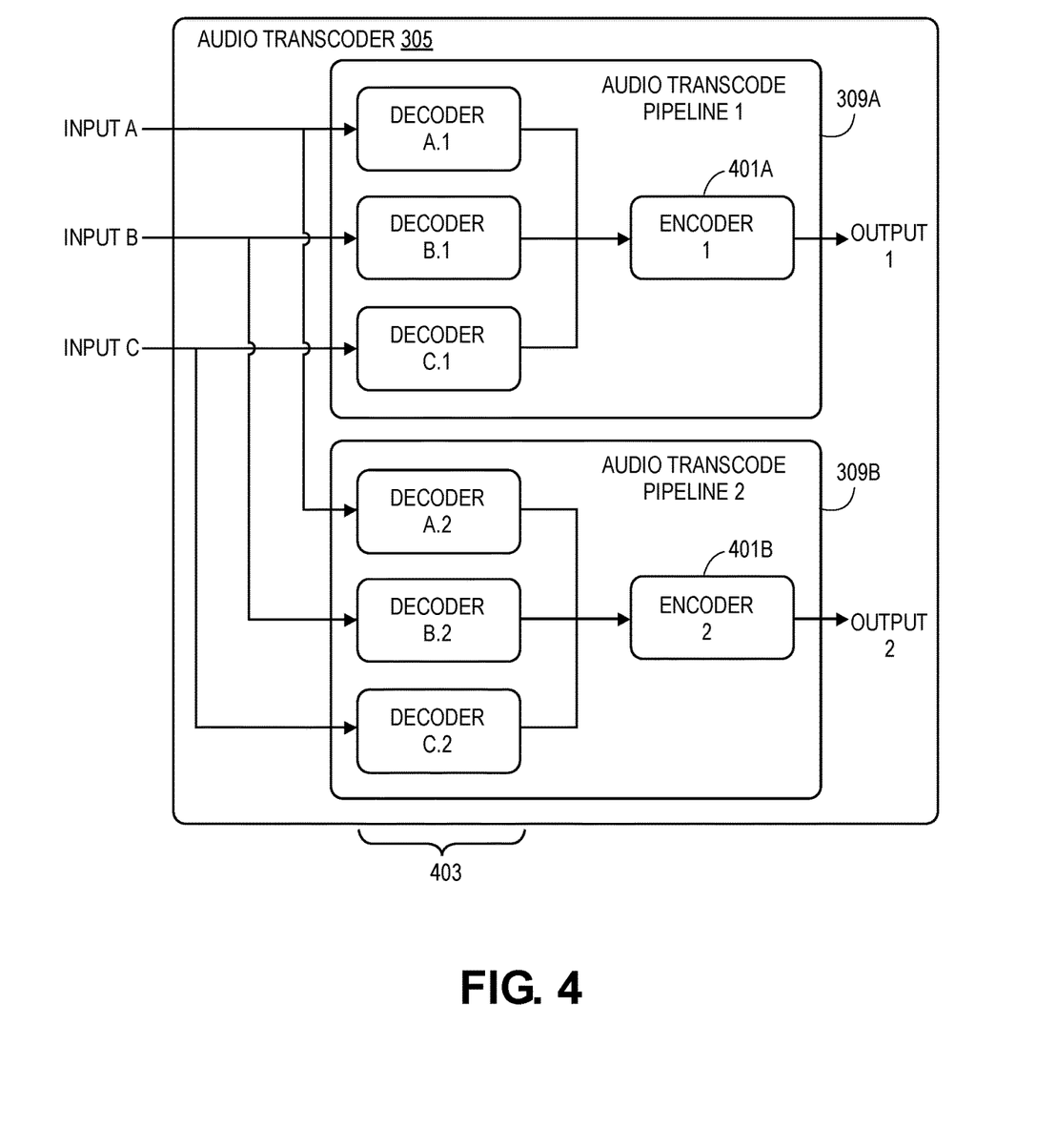
FIG. 4 is a diagram of one example embodiment of an audio transcoder.

FIG. 4 is a diagram of one example embodiment of an audio transcoder. In this example embodiment of the audio transcoder two sets of inputs (A and B) are present with associated decoders 403 in each audio transcode pipelines 309A, B. A third audio input is detected and provided (input C), which causes the dynamic transcoding configurator to set up corresponding decoders (C.1 and C.2) in the respective audio transcoder pipelines 309A, B.

In the example embodiments, each audio transcoder pipeline 309A, B includes an encoder 401A, B that consumes audio from multiple decoders 403. When a new input is added with different codec or configuration (e.g., Input C), new decoders (e.g., C.1 and C.2) are added to each audio transcoder pipeline 309A, B encoder (1 & 2). Each decoder is configured with an output specific to the encoder of the audio transcoder pipeline to which the decoder is added. One or more decoders may be decoding inputs at any given time but only one of those inputs will contain "active" audio frames. The type of each incoming audio format is detected during de-multiplexing and sent to the correct decoders of the respective audio transcoding pipeline. The dynamic transcoding configurator is advantageous, because it allows for the dynamic addition of new input sources during transcoding of a live media stream even though the decoder-encoder configurations are tightly coupled and it is not possible to restart or add new encoders once transcoding has started.

In one example, referencing FIG. 3, the audio transcoder 305 is configured to output Dolby AC-3 5.1 (Output 1) via audio transcoder pipeline 309A and encoder 401A and AAC Stereo (Output 2) via audio transcoder pipeline 309B and encoder 401B. The audio transcoder 305 initially processes an input audio stream containing 5.1 EAC-3 Dolby audio tied to a movie (in the video transcoder) via input A. This input A is passed to the encoders A.1 and A.2. The input audio stream switches to an advertisement with AAC stereo input (input B). This causes additional decoders B.1 and B.2 to initialized by the dynamic transcoding configurator to process the AAC input. Decoders A.1 and A.2 can continue to process further data until the advertisement ends and the stream reverts to AC-3 5.1. However, the input data to A.1 and A.2 will not be marked as "active" so their outputs will be discarded prior to encoding. Only active audio from B.1 and B.2 will be sent to their respective encoders. A further switch in the input audio format (Input C) can similarly cause the addition of decoders Cl and C.2 in the respective audio transcoding pipelines 309A, B.

Figure 5:
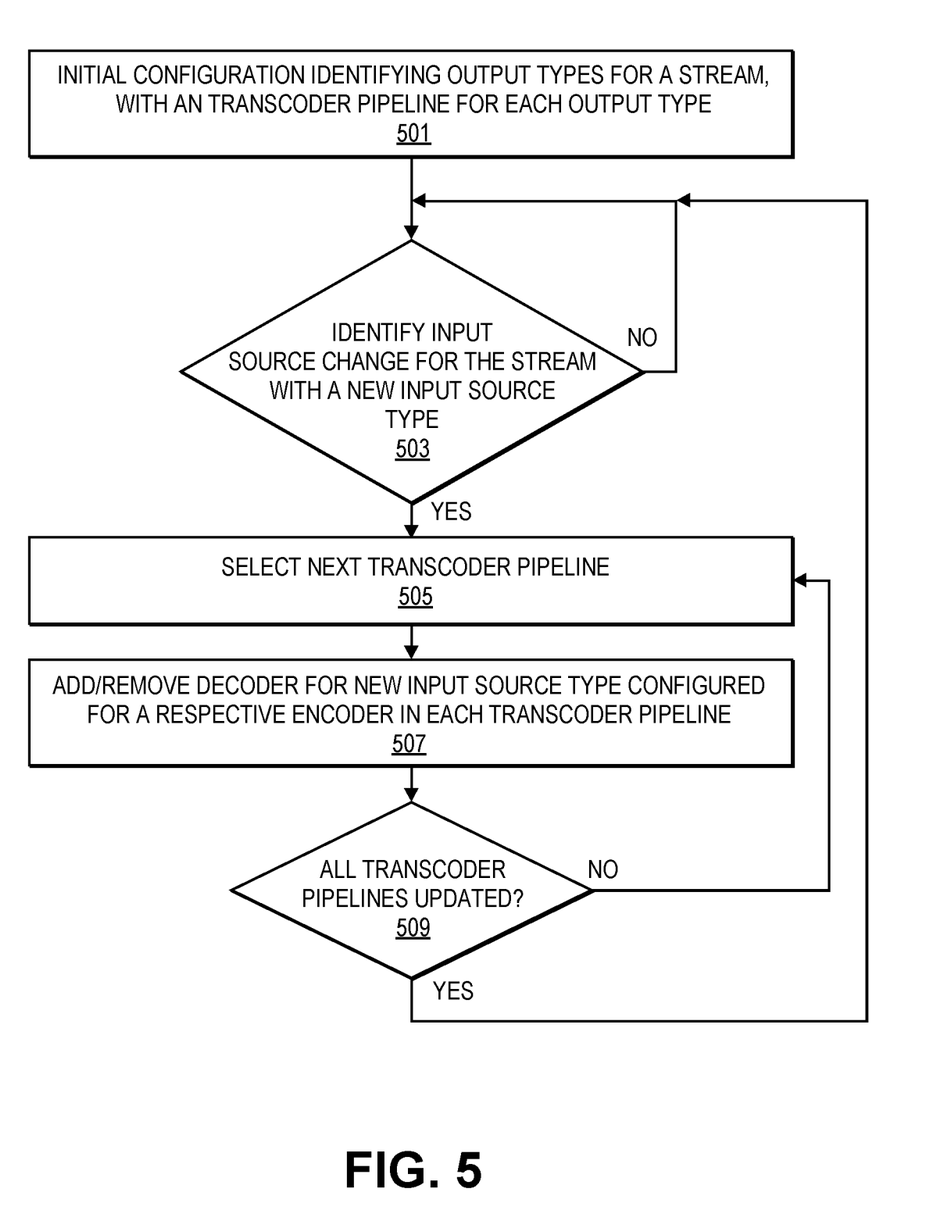
FIG. 5 is a flowchart of one embodiment of a process of the dynamic transcoding configurator.

FIG. 5 is a flowchart of one embodiment of a process of the dynamic transcoding configurator. The process can be initiated to handle an input audio/video stream by the audio/video streaming platform, which initiates audio and video transcoders for the input audio/video stream and a dynamic transcoding configurator to manage the audio and/or video transcoder. A separate transcoding pipeline can be established within each audio or video transcoder with a dedicated encoder to generate each of the output formats for a target or destination of the audio/video stream (Block 501). Each transcoding pipeline can be set up with decoders for each known input format that are configured to generate an output that is suitable as input for the encoder of the transcoding pipeline.

The dynamic transcoding configurator then monitors for or awaits notification of any changes in the format of the input audio/video source to identify new encodings/formats in the input audio/video (Block 503). If no new input formats/encodings are detected, then the process continues to monitor or await notification of changes in the input source format. In some embodiments, the source demuxer or similar component can recognize the change in input sources and notify the dynamic transcoding configurator using any signal or message to indicate the change in input source and initiate a dynamic update to the transcoding pipelines. For example, the input stream can have a transport stream (TS) format that contains data describing available streams. When changes are detected in this TS format data, the source demuxer or similar component can send a message to the dynamic transcoding configurator indicating that a source has been added or removed from the input stream. In cases where an added source has a new format, a new decoder will be needed to handle the new format. For example, a channel can be configured with a primary live source and a secondary live source, as well as a slate source to be utilized if the live sources are unavailable. In one example case, for a (main) live source there is a process for demuxing the stream and examining the stream metadata (the PMT) to look for source additions and removals. In addition, other non-live slate sources may be added or removed. There can be a source switcher component that tracks this.

In response to detecting a change in input source format/encoding, the dynamic transcoding configurator selects a next transcoding pipeline to update (Block 505). For the selected transcoding pipeline a decoder for the new detected input type is added and configured to output specific to the requirements of the encoder of the transcoding pipeline. A check is then made whether there are additional transcoding pipelines to be updated (Block 509). If no further transcoding pipelines remain to be updated, then the process can continue to monitor or await notification of further input source format/encoding changes. If further transcoding pipelines remain to be updated, then the next transcoding pipeline is selected to be updated 505. The process can continue until all of the transcoding pipelines are updated and for as long as the audio/video stream continues to provide data.

The embodiments described a process for adding decoders to existing and executing audio/video transcoding pipelines. A similar asynchronous process can be utilized to remove decoders that are no longer in use in the audio/video transcoding pipeline. A decoder can be removed in response to the dynamic transcoding configurator detecting or receiving notification that the input source no longer includes an input stream with a correlated format, detecting that the decoder has not been used for a configured time span, over a configured number of input source switches, or under similar circumstances that can be configured by an administrator of the streaming platform. In some embodiments, a set of decoders is maintained that correlates with each of the formats of the input sources identified in the input stream (e.g., in TS format data) such that any format not present in the stream can have the correlated decoder removed from the transcoding pipeline. In other embodiments, a fixed or configured maximum number of decoders can be maintained as active in the transcoding pipelines with the last recently used decoder being evicted in response to an addition of a new decoder to the transcoding pipeline.

Figure 6:
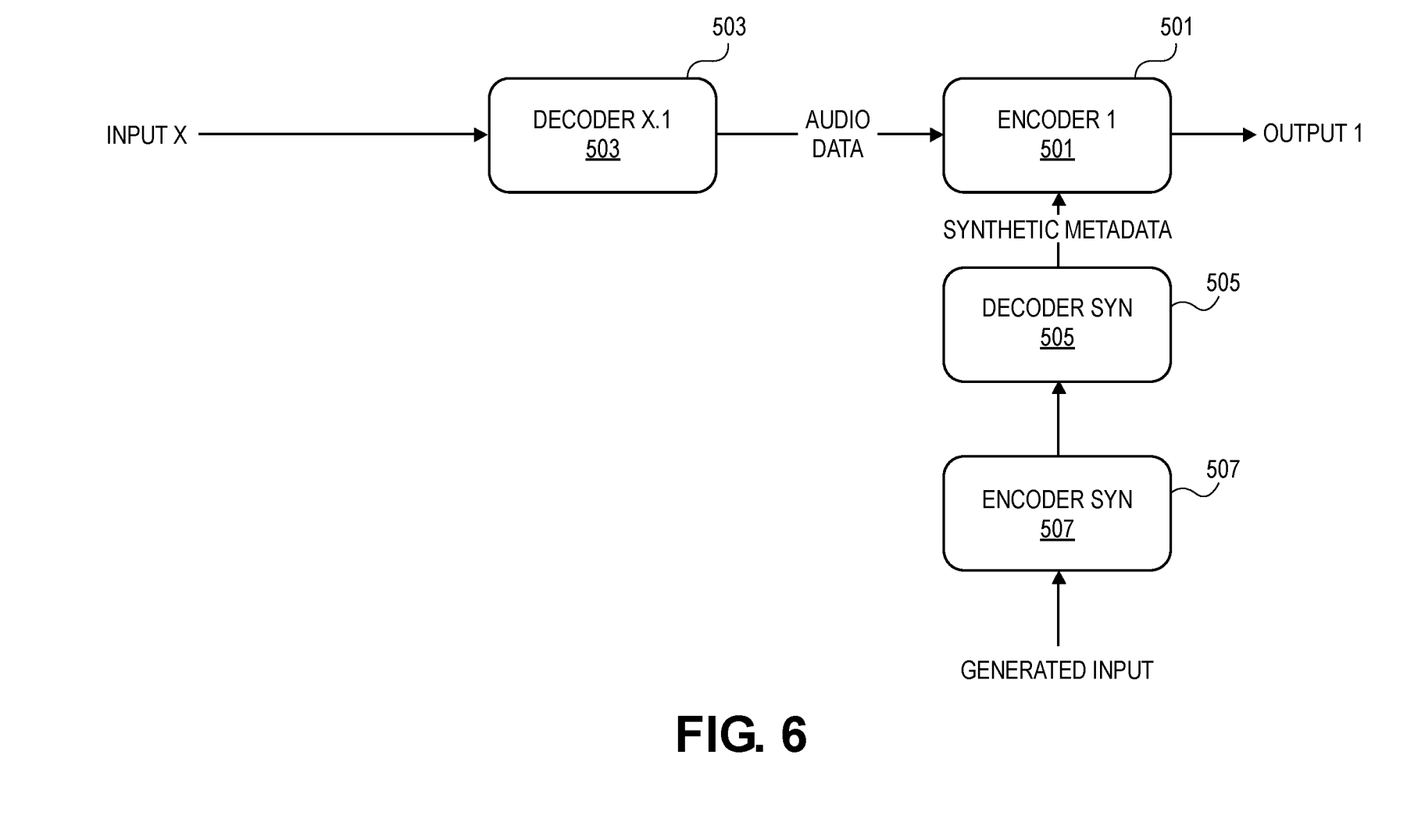
FIG. 6 is a diagram of one embodiment of a transcoding pipeline that supports the use of cached or synthetic meta data.

FIG. 6 is a diagram of one embodiment of a transcoding pipeline that supports the use of cached or synthetic meta data. In an example case where the input audio/video has a format or codec (e.g., Input X) that does not contain metadata required by the encoder the decoder 503 will not be able to extract the metadata and provide it to the encoder 501 of the transcoding pipeline. In the embodiments, a new encoder cannot be started and configured to provide a target output without disruption to the output. The dynamic transcoding configurator can support several approaches to pass correct metadata to the encoder 501 in cases where it is not present in the decoder 503.

In the case where an input containing metadata has been previously decoded by the transcoding pipeline, then this metadata can be cached either in the encoder, the transcoding pipeline, the dynamic transcoding configurator, or in a similar component of the streaming platform. When the input switches to a source with a format/codec that does not include metadata the cached metadata can be used.

In the case where no previous input source provided metadata for an associated format/encoding has been previously decoded and cached, then synthetic metadata can be generated and utilized used. Synthetic metadata can be generated by creating an additional encoder 507/decoder 505 pair on the fly that is provided a copy of the input audio/video stream input configuration, thus its output will match the required encoder input configuration. The generated audio can be silent, it does not need to contain the same audio data, but has the same configuration, codec, number of channels, sample rate, bit rate, and or similar characteristics to ensure that the generated metadata matches the actual input audio/video. The synthetic encoder (Encoder SYN) 507 and synthetic decoder (Decoder SYN) 505 have the same configuration as the respective encoder that supplied the input audio/video stream and the decoder 503. The synthetic decoder (Decoder SYN) outputs a stream containing correct metadata for the use of the encoder 501. This metadata can be combined with the actual input audio/video data as input to the encoder 501. The metadata does not change during transcoding or over time, thus once the metadata has been generated once it can be cached for future reuse.

Figure 7:
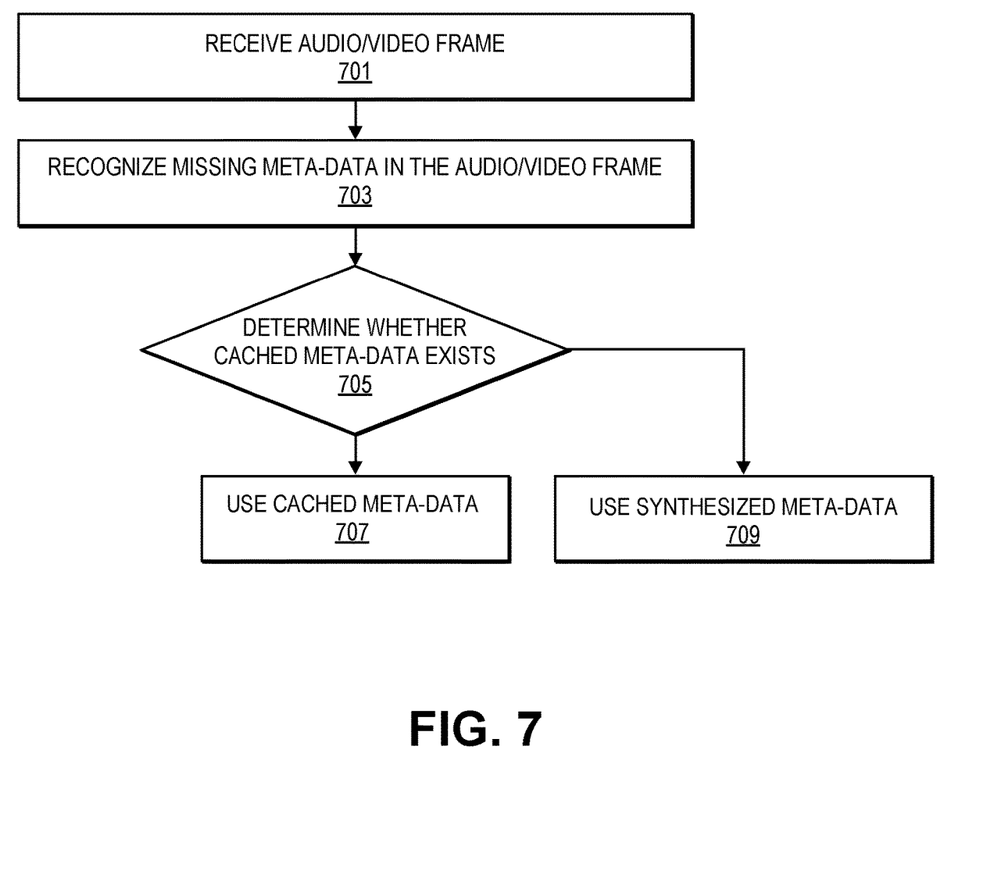
FIG. 7 is a flowchart of one embodiment of a process for managing metadata by a dynamic transcoding configurator.

FIG. 7 is a flowchart of one embodiment of a process for managing metadata by a dynamic transcoding configurator. In some embodiments, the functions of the metadata management are implemented by the dynamic transcoding configurator, while in other embodiments a separate component or function, a metadata manager, performs the illustrated elements of the process. The process can be initiated by receiving an audio or video frame (Block 701). The audio or video frame is examined to detect whether metadata that is requisite for the encoder is present in the audio or video frame (Block 703). In the case of the audio frames, the input audio stream is decoded to per-channel audio data (PCM, or any other raw audio format) and metadata if the input format supports it. Only some formats (e.g., Dolby) support metadata. In the case where there is metadata, the encoder must be provided with this metadata in order to correctly encode an output. If there is missing metadata, then a check is made whether there is cached metadata that corresponds to the characteristics of the received audio or video frame that can be paired with the audio or video frame that can be substituted for the missing metadata (Block 705). If there is metadata that matches the characteristics of the received audio/video frame, then this can be utilized and provided to the encoder in place of the missing metadata (Block 707). If there is no cached metadata, then synthesized metadata can be generated using a synthesizing encoder and synthesizing decoder that replicate the encoding of the input audio/video source and the decoder that are configured in the same manner as the input stream to ensure proper synthesis of the metadata to be provided to the encoder of the transcoding pipeline.

In some embodiments, the determination of the metadata is made upon each switch in input source format/encoding, while in other embodiments the determination of the metadata can be more frequent as needed by the encoder, on a frame by frame basis, or under similar conditions. In embodiments where the determination of the metadata is on a frame by frame basis this configuration has a low computational cost, in particular if the synthetic metadata is cached and not performed on each frame.

Electronic Devices Implementing Embodiments of the Invention

Figure 8:
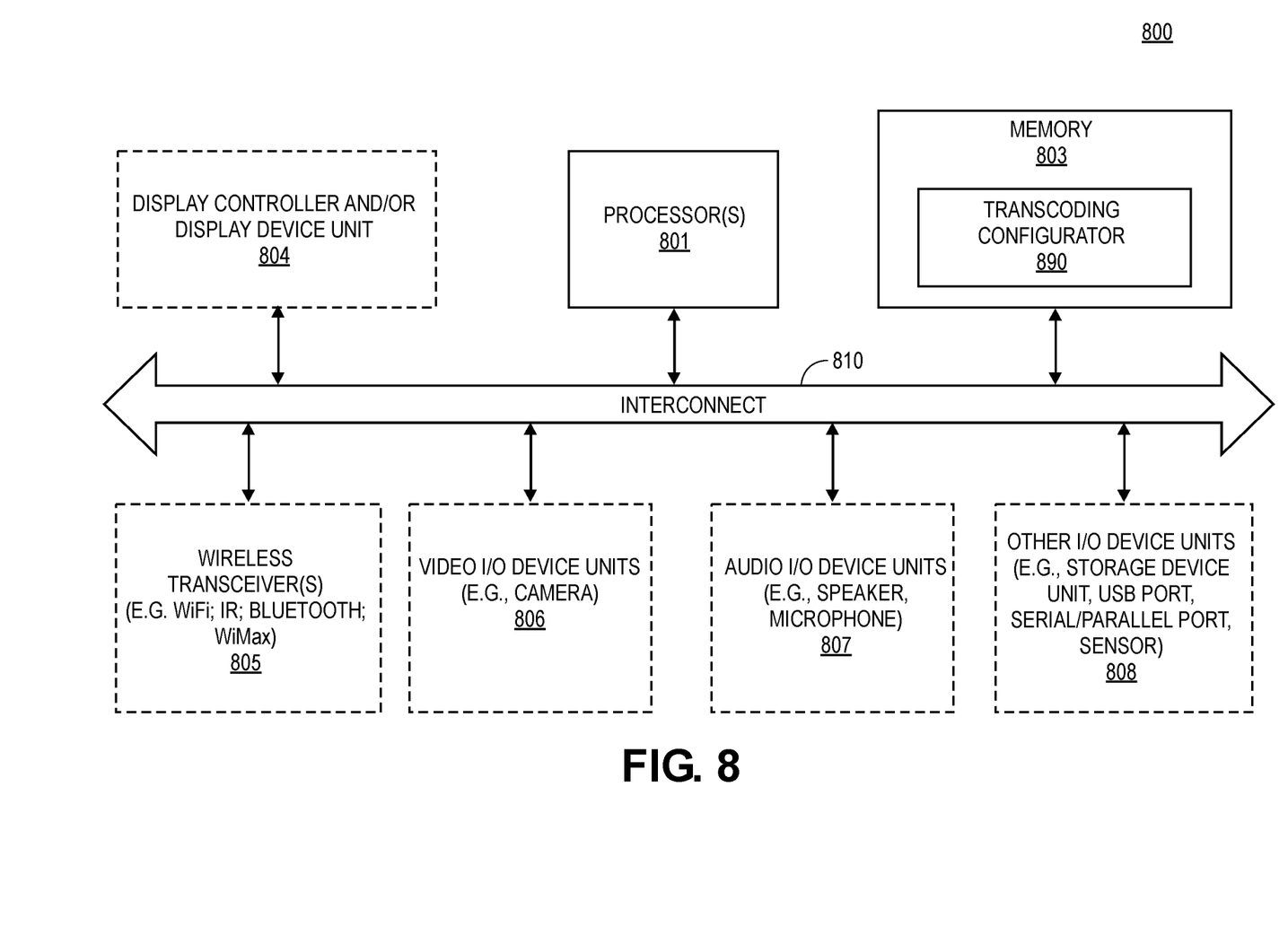
FIG. 8 is a block diagram illustrating an electronic device that may execute a dynamic transcoding configurator of a video streaming platform according to one embodiment of the invention.

FIG. 8 is a block diagram illustrating an electronic device that may serve to support execution of a dynamic transcoding configurator of a video streaming platform in a cloud computing environment according to one embodiment of the invention. The electronic device may be a computing device (e.g., a computer server) of a cloud computing environment). The system 800 may represent the dynamic transcoding configurator described above performing any of the processes or methods for managing transcoding in a video streaming system described above. The system 800 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 800 is intended to show a high level view of many components of the computing system. However, it is to be understood that additional components may be present in certain implementations and furthermore, different arrangement of the components shown may occur in other implementations.

In one embodiment, the system 800 includes a processor 801, memory 803, and optionally device units 804-808 that are interconnected via a bus or an interconnect 810. A processor 801 may represent a single processor or multiple processors with a single processor core or multiple processor cores included therein. The processor 801 may represent one or more general-purpose processors such as a microprocessor, a central processing unit (CPU), or processing device. More particularly, the processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 801 may communicate with the memory 803, which in an embodiment can be implemented via multiple memory devices to provide for a given amount of system memory. The memory 803 may include one or more volatile storage (or memory) devices such as random access memory (RAM), dynamic RAM (DRAM), synchronous DRAM (SDRAM), static RAM (SRAM), or other types of storage devices. The memory 803 may store information including sequences of instructions that are executed by the processor 801, or any other device units. For example, executable code and/or data of a variety of operating systems, device drivers, firmware (e.g., input output basic system or BIOS), and/or applications can be loaded in the memory 803 and executed by the processor 801. An operating system can be any kind of operating systems, such as, for example, Windows® operating system from Microsoft®, Mac OS®/iOS° from Apple, Android® from Google®, Linux®, Unix®, or other real-time or embedded operating systems such as VxWorks.

The memory 803 contains a dynamic transcoding configurator 890, which may contain instructions to perform the operations of macroblock detection and mitigation as discussed herein above. The dynamic transcoding configurator 890 may contain functional blocks as illustrated in the dynamic transcoding configurator 890 discussed herein above. The processor 801 may instantiate the dynamic transcoding configurator 890 or monitor to perform operations to detect and mitigate macroblocks as discussed herein above.

The system 800 may optionally further include input/output (I/O) devices such as the device units 804-808, including display control and/or display device unit 804, wireless transceiver(s) 605, video I/O device unit(s) 606, audio I/O device unit(s) 807, and other I/O device units 808 as illustrated. The wireless transceiver 605 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 800 may also include an ultrasound device unit (not shown) for transmitting a conference session code.

The video I/O device unit 606 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 807 may include a speaker and/or a microphone to facilitate voice-enabled functions, such as voice recognition, voice replication, digital recording, and/or telephony functions. Other optional devices 808 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 808 may further include certain sensors coupled to the interconnect 810 via a sensor hub (not shown), while other devices such as a keyboard or thermal sensor may be controlled by an embedded controller (not shown), dependent upon the specific configuration or design of the system 800.

The system 800 may be coupled to an orchestrator in an orchestrator as illustrated in FIG. 2. Additionally, the system 800 may be integrated within a streaming platform coordinator 170, similar to the dynamic transcoding configurator 185 illustrated in FIG. 1. The system 800 may perform methods discussed herein above relating to FIGS. 3A-4.

Note that while the system 800 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A method for managing transcoding of data in a stream, the method comprising:
    decoding data in the stream through one or more decoders to output to an encoder in a transcoder pipeline;

identifying an input source change for the stream with a new input source type, after initial configuration and operation of the stream; and adding a decoder for the new input source type, in response to identifying the input source change, the added decoder configured to match configuration of the encoder in a-the transcoder pipeline for the new input source type, wherein the added decoder is to decode audio frames of the stream, wherein the audio frames are marked as active based on the added decoder for the identified new input source type, prior to providing to the added decoder, and wherein output of the added decoder is provided to the encoder while output of the one or more decoders for the stream is discarded prior to reaching the encoder, wherein a number of decoders in the transcoder pipeline is maintained within a threshold.

2. The method of claim 1, further comprising:
configuring a plurality of transcoder pipelines for the stream, each of the plurality of transcoder pipelines to have a different output configuration and an encoder with a different configuration.

3. The method of claim 2, further comprising:
adding a separate decoder for the new input source type to each of the plurality of transcoder pipelines, each separate decoder configured to output for input requirements of a respective encoder in a respective transcoder pipeline.

4. The method of claim 1, wherein the decoder is configured to provide metadata required by the encoder.

5. The method of claim 1, further comprising:
receiving an audio frame for the stream;
identifying missing metadata in the audio frame; and
determining whether cached metadata for the audio frame is available.

6. The method of claim 5, further comprising:
adding cached metadata to the audio frame, in response to determining the cached metadata is available.

7. The method of claim 5, further comprising:
adding synthesized metadata for the audio frame, in response to determining the cached metadata is not available.

8. A computing device, comprising:
a non-transitory machine-readable medium having stored therein a dynamic transcoding configurator; and
a processing device coupled to the non-transitory machine-readable medium, the processing device to execute the dynamic transcoding configurator, the dynamic transcoding configurator to cause decoding data in a stream through one or more decoders to output to an encoder in a transcoder pipeline, to identify an input source change for the stream with a new input source type, after initial configuration and operation of the stream, and to add a decoder for the new input source type, in response to identifying the input source change, the added decoder configured to match configuration of the encoder in the transcoder pipeline for the new input source type, wherein the added decoder is to decode audio frames of the stream, wherein the audio frames are marked as active based on the added decoder for the identified new input source type, prior to providing to the added decoder, and wherein output of the added decoder is provided to the encoder while output of the one or more decoders for the stream is discarded prior to reaching the encoder, wherein a number of decoders in the transcoder pipeline is maintained within a threshold.

9. The computing device of claim 8, wherein the dynamic transcoding configurator is further to configure a plurality of transcoder pipelines for the stream, each of the plurality of transcoder pipelines to have a different output configuration and an encoder with a different configuration.

10. The computing device of claim 9, wherein the dynamic transcoding configurator is further to add a separate decoder for the new input source type to each of the plurality of transcoder pipelines, each separate decoder configured to output for input requirements of a respective encoder in a respective transcoder pipeline.

11. The computing device of claim 8, wherein the decoder is configured to provide metadata required by the encoder.

12. The computing device of claim 8, wherein the dynamic transcoding configurator is further to receive an audio frame for the stream, identify missing metadata in the audio frame, and to determine whether cached metadata for the audio frame is available.

13. The computing device of claim 12, wherein the dynamic transcoding configurator is further to add cached metadata to the audio frame, in response to determining the cached metadata is available.

14. The computing device of claim 12, wherein the dynamic transcoding configurator is further to add synthesized metadata for the audio frame, in response to determining the cached metadata is not available.

15. A non-transitory machine-readable storage medium that provides instructions that, if executed by a processor, will cause said processor to perform operations for managing transcoding of data in a stream, the operations comprising:
decoding data in the stream through one or more decoders to output to an encoder in a transcoder pipeline;
identifying an input source change for the stream with a new input source type, after initial configuration and operation of the stream; and
adding a decoder for the new input source type, in response to identifying the input source change, the added decoder configured to match configuration of the encoder in a-the transcoder pipeline for the new input source type, wherein the added decoder is to decode audio frames, wherein the audio frames are marked as active based on the added decoder for the identified new input source type, prior to providing to the added decoder, and wherein output of the added decoder is provided to the encoder while output of the one or more decoders for the stream is discarded prior to reaching the encoder, wherein a number of decoders in the transcoder pipeline is maintained within a threshold.

16. The non-transitory machine-readable storage medium of claim 15 having further instructions stored therein, which when executed cause the processor to perform operations further comprising:
configuring a plurality of transcoder pipelines for the stream, each of the plurality of transcoder pipelines to have a different output type and a different encoder.

17. The non-transitory machine-readable storage medium of claim 16, having further instructions stored therein, which when executed cause the processor to perform operations further comprising:
adding a separate decoder for the new input source type to each of the plurality of transcoder pipelines, each separate decoder configured to output for input requirements of a respective encoder in a respective transcoder pipeline.

18. The non-transitory machine-readable storage medium of claim 15, wherein the decoder is configured to provide metadata required by the encoder.

19. The non-transitory machine-readable storage medium of claim 15, having further instructions stored therein, which when executed cause the processor to perform operations further comprising:

receiving an audio frame for the stream;
identifying missing metadata in the audio frame; and
determining whether cached metadata for the audio frame is available.

20. The non-transitory machine-readable storage medium of claim 19, having further instructions stored therein, which when executed cause the processor to perform operations further comprising:

adding cached metadata to the audio frame, in response to determining the cached metadata is available.

21. The non-transitory machine-readable storage medium of claim 19, having further instructions stored therein, which when executed cause the processor to perform operations further comprising:

adding synthesized metadata for the audio frame, in response to determining the cached metadata is not available.

* * * * *

UNITED STATES PATENT AND TRADEMARK OFFICE
CERTIFICATE OF CORRECTION

| | | |
|---|---|---|
| PATENT NO. | : 11,843,792 B2 | Page 1 of 1 |
| APPLICATION NO. | : 17/096876 | |
| DATED | : December 12, 2023 | |
| INVENTOR(S) | : Adrian Miller | |

It is certified that error appears in the above-identified patent and that said Letters Patent is hereby corrected as shown below:

In the Claims

In Claim 1, Line 9 (Column 17, Line 7), delete "a-the" and insert --the--

In Claim 15, Line 3 (Column 18, Line 42), delete "a-the" and insert --the--

In Claim 16, Line 1 (Column 18, Line 53), delete "15" and insert --15,--

Signed and Sealed this
Fifth Day of March, 2024

Katherine Kelly Vidal
*Director of the United States Patent and Trademark Office*